United States Patent Office 3,734,903
Patented May 22, 1973

3,734,903
PENICILLINS DERIVED FROM THE REACTION OF ENAMINES WITH 6-ISOCYANATOPENICIL-LANIC ACID SACCHARIMIDE
James L. Diebold, Broomall, Joel S. Sanet, St. Davids, and Milton Wolf, West Chester, Pa., assignors to American Home Products Corporation, New York, N.Y.
No Drawing. Filed June 3, 1971, Ser. No. 149,848
Int. Cl. C07d 99/16
U.S. Cl. 260—239.1
2 Claims

ABSTRACT OF THE DISCLOSURE

Novel penicillanic acid derivatives have been prepared by the reaction of an enamine with 6-isocyanatopenicillanic acid saccharimide.

The invention is concerned with the production of novel penicillanic acid derivatives of Formula I:

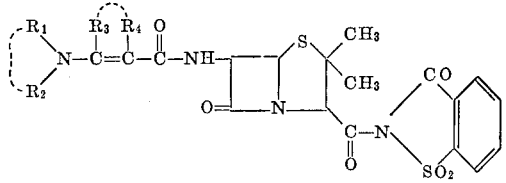

wherein $R_1$ and $R_2$ are (lower)alkyl; or $R_1$ and $R_2$ may be concatenated to form a heterocyclic ring selected from the group consisting of morpholino, piperidino, pyrrolidino, and N-alkylpiperazino; $R_3$ and $R_4$ are selected from the group consisting of hydrogen and (lower)alkyl; or $R_3$ and $R_4$ may be concatenated to form a ring selected from the group consisting of cyclopent-1-en-1,2-ylene, cyclohex-1-ene-1,2-ylene, cyclohept-1-ene-1,2-ylene, 1-methyl-1,2,5,6-tetrahydropyrid-3-ene-3,4-ylene.

As used herein the term (lower)alkyl is employed to describe hydrocarbon groups having one to about six carbon atoms such as methyl, ethyl, propyl, i-propyl, hexyl, etc. The term enamine is used to describe straight chain, branched chain, cyclic, substituted cyclic and fused ring structures containing the

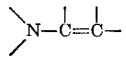

moiety.

The novel enamine substituted penicillanic acid derivatives of the invention are prepared by reacting the appropriate enamine reactant with the saccharimide of 6-isocyanatopenicillanic acid. The reaction is conducted in an organic solvent such as dried methylene chloride tetrahydrofuran, chloroform, or any other appropriate solvent.

The following reaction scheme illustrates the process for the preparation of the compounds of the invention:

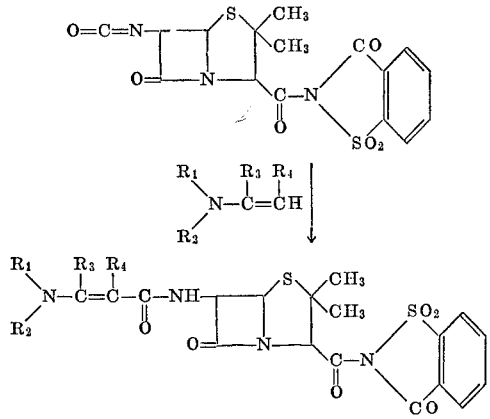

The novel enamine penicillanic acid saccharimides may be separated from the reaction mixture by in vacuo evaporation of the solvent or by other techniques well known to those skilled in the art.

The novel compounds of the invention are antibacterial agents useful in treating bovine mastitis and other infections amenable to therapy with penicillanic acid derivatives such as benzylpenicillin. They are also useful as growth promoters for domestic animals such as cattle and hogs. The compounds of the invention are also useful for the inhibition of Staph. aureau, Smith at a concentration of less than 75 micrograms/ml. when applied in an aqueous vehicle.

The following examples are added to illustrate but not to limit the scope of the invention:

EXAMPLE I 2-(6-[1,2,5,6-tetrahydro - 1 - methyl-4-(1-pyrrolidinyl) nicotinamido]-3,3-dimethyl - 7 - oxo-4-thia-1-azabicyclo[3.2.0]hept - 2 - ylcarbonyl)-1,2-benzisothiazolin-3-one 1,1-dioxide To a solution of 3.00 g. of 2-[(6-isocyanato-3,3-dimethyl-7-oxo-4-thia-1-azabicyclo[3.2.0]hept - 2 - yl)carbonyl]-1,2-benzisothiazolin-3-one 1,1-dioxide (0.00736 m.) in 50 ml. of dried methylene chloride at 5° was added a solution of 1.18 g. of the pyrrolidine enamine of N-methyl-4-piperidone in 20 ml. of dried methylene chloride over a period of 40 minutes. The ice bath was removed, and stirring was continued for 19 hours. The solvent was removed by evaporation leaving an orange solid. I.R. (in KBr) absorption maxima 2.95μ, 5.6μ, 5.75μ, 6.1μ, 6.6μ. Iodometric Assay 47%.

EXAMPLE II

By methods analogous to those employed in Example I the following compounds are prepared:

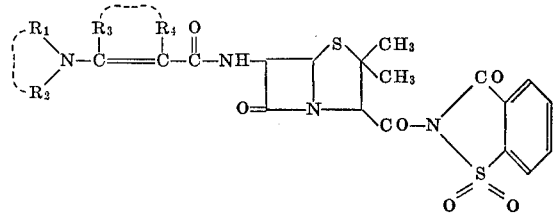

| $R_1$ | $R_2$ | $R_3$ | $R_4$ |
|---|---|---|---|
| $CH_3$ | $CH_3$ | H | H |
| $C_2H_5$ | $C_2H_5$ | H | H |
| $C_3H_7$ | $C_3H_7$ | H | $CH_3$ |
| $CH_3$ | $CH_3$ | $C_2H_5$ | H |
| $CH_3$ | $CH_3$ | $C_3H_7$ | H |
| $C_2H_5$ | $C_2H_5$ | $CH_3$ | $CH_3$ |
| $CH_3$ | $CH_3$ | H | $C_2H_5$ |
| $CH_3$ | $CH_3$ | H | $C_3H_7$ |
| $C_4H_9$ | $C_4H_9$ | H | $CH_3$ |
| $CH_3$ | $CH_3$ | H | $C_4H_9$ |
| $CH_3N\langle\rangle$ | | H | $CH_3$ |
| $\langle CH_2CH_2/CH_2\rangle$ | | $CH_3$ | H |
| $CH_3$ | $CH_3$ | \cyclopropyl | |
| $CH_3$ | $CH_3$ | \cyclobutyl | |
| $CH_3$ | $CH_3$ | \cyclopentyl | |

We claim:
1. A compound selected from the group consisting of:

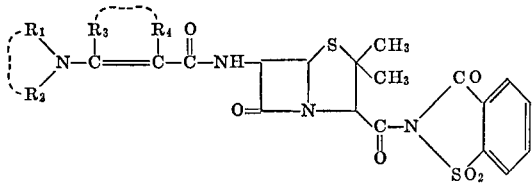

wherein
R₁ and R₂ are individually (lower)alkyl and when taken together with the nitrogen atom to which they are attached, form a heterocyclic ring selected from the group consisting of piperidino, pyrrolidino, and N-(lower)alkylpiperazino;
R₃ and R₄ are individually selected from the group consisting of hydrogen and (lower)alkyl and when taken together with the ethenylene group to which they are attached, form a cyclic moiety selected from the group consisting of cyclopent-1-en-1, 2-ylene, cyclohex-1-en-1, 2-ylene, cyclohept-1-en-1, 2-ylene and 1-methyl-1,2,5,6-tetrahydropyrid-3-en-3,4-ylene.

2. A compound as defined in claim 1 which is: 2-(6-[1,2,5,6-tetrahydro - 1 - methyl-4-(1-pyrrolidinyl)nicotinamido]-3,3-dimethyl-7-oxo - 4 - thia-1-azabicyclo[3.2.0] hept-2-ylcarbonyl)-1,2-benzisothiazolin-3-one 1,1-dioxide.

References Cited
UNITED STATES PATENTS

| | | | |
|---|---|---|---|
| 3,652,546 | 3/1972 | Cheney et al. | 260—239.1 |
| 3,652,547 | 3/1972 | Wolf et al. | 260—239.1 |
| 3,652,548 | 3/1972 | McCaully et al. | 260—239.1 |

NICHOLAS S. RIZZO, Primary Examiner

U.S. Cl. X.R.
424—271